United States Patent
Bergman

(10) Patent No.: US 10,002,541 B1
(45) Date of Patent: Jun. 19, 2018

(54) MUSICAL MODIFICATION METHOD

(71) Applicant: Berggram Development Oy, Helsinki (FI)

(72) Inventor: Jussi Bergman, Helsinki (FI)

(73) Assignee: Berggram Development Oy, Helsinki (FI)

(*) Notice: Subject to any disclaimer, the term of this patent is extended or adjusted under 35 U.S.C. 154(b) by 0 days. days.

(21) Appl. No.: 15/368,699

(22) Filed: Dec. 5, 2016

(51) Int. Cl.
G09B 15/00 (2006.01)
G09B 15/02 (2006.01)

(52) U.S. Cl.
CPC ....... *G09B 15/00* (2013.01); *G10H 2210/066* (2013.01); *G10H 2210/091* (2013.01); *G10H 2220/015* (2013.01); *G10H 2240/131* (2013.01)

(58) Field of Classification Search
CPC .......... G09B 15/00; G09B 15/023; G10H 2210/066; G10H 2210/091; G10H 2220/015; G10H 2240/131; G10H 1/008; G10H 2220/091
USPC .................................. 84/473, 478
See application file for complete search history.

(56) References Cited

U.S. PATENT DOCUMENTS

| | | | | |
|---|---|---|---|---|
| 4,771,671 A * | 9/1988 | Hoff, Jr. | ........... | G10H 1/366 84/453 |
| 5,266,735 A * | 11/1993 | Shaffer | ........... | G09B 15/003 84/464 A |
| 8,273,976 B1 * | 9/2012 | Dalby | ........... | G10H 1/0066 84/477 R |
| 8,338,684 B2 * | 12/2012 | Pillhofer | ........... | G09B 15/00 84/470 R |
| 8,865,990 B2 * | 10/2014 | Minamitaka | ........... | G10H 1/0008 84/609 |
| 9,018,503 B2 * | 4/2015 | Tanaka | ........... | G09B 15/00 84/465 |
| 9,601,029 B2 * | 3/2017 | Gebauer | ........... | G09B 15/023 |
| 2001/0039870 A1 * | 11/2001 | Shimaya | ........... | G09B 15/023 84/478 |
| 2004/0123726 A1 * | 7/2004 | Kato | ........... | G10H 1/0008 84/609 |
| 2005/0235809 A1 * | 10/2005 | Kageyama | ........... | G10H 1/0008 84/601 |
| 2007/0022866 A1 * | 2/2007 | Perla | ........... | G09B 15/00 84/609 |
| 2008/0002549 A1 * | 1/2008 | Copperwhite | ........... | G10G 1/00 369/83 |
| 2009/0031884 A1 * | 2/2009 | Arai | ........... | G09B 15/002 84/609 |
| 2010/0304863 A1 * | 12/2010 | Applewhite | ........... | G10H 1/368 463/36 |
| 2011/0003638 A1 * | 1/2011 | Lee | ........... | G09B 15/00 463/35 |
| 2011/0283866 A1 * | 11/2011 | Hogan | ........... | G09B 15/003 84/470 R |

(Continued)

*Primary Examiner* — Jeffrey Donels
(74) *Attorney, Agent, or Firm* — BelayIP Oy

(57) ABSTRACT

A method for producing modified music can be for facilitating playing of a musical instrument and/or facilitate learning of a song. Such methods can include several computer implemented steps which can be some or all of the following steps; digitally obtaining original note data about a song and/or original audio data of the song, creating modified note data for a musical instrument, synchronizing audio data of the song to the modified note data, and presenting the modified note data to a user. The steps can also be ordered as outlined above and below.

20 Claims, 3 Drawing Sheets

(56) References Cited

U.S. PATENT DOCUMENTS

2013/0081531 A1* 4/2013 Minamitaka ............. G10H 1/00
 84/477 R
2015/0317911 A1* 11/2015 Kawabata ................ G10G 1/00
 84/470 R

* cited by examiner

MUSICAL MODIFICATION METHOD

FIELD OF INVENTION

The present invention relates to the field of learning musical instruments. In particular, the embodiments of the present invention relate to methods of modification of existing music in order to make the music easier to learn and/or to make the instrument easier to learn.

BACKGROUND OF INVENTION

Learning how to play a musical instrument and songs have been a persistent challenge. A major challenge, particularly for a beginning musician, is the complexity of well known songs and the scarcity of easy music which is interesting to the player.

Many people who start playing an instrument quit early on in their studies due to difficulty in learning and loosing interest in learning. One way to easily keep the interest of a student is to teach them to play songs which they know early on and which they can recognize. However, finding versions of a desired song which are technically at the level which a new student can play is often impossible or impractical at best. Therefore, there exists a need for a way to automatically generate music which a student can play at their own skill level from songs which are familiar to the student.

Additionally, when learning a complex song, or at the very early stages in a musician's studies, it is very difficult or impossible for a student to learn notes, melody, timing, intonation, intensity, chords, strumming, fretting and other aspects of musicality simultaneously. Additionally, when focusing on only one aspect of a song the learning can become monotonous or the user may not have the imagination necessary to see how their playing of the single aspect fits with the rest of the song. Therefore, there exists a need for a musical augmentation system and/or method where a user can learn, focus and/or play only one aspect of a song but be presented with the whole familiar song or a version thereof so the student can tell how the part they are playing interacts with the song as a whole.

SUMMARY OF THE INVENTION

Described herein is a method for producing modified music for facilitating playing of a musical instrument.

Methods can comprise some or all of the following steps; digitally obtaining original note data about a song and original audio data of the song, creating modified note data for a musical instrument by applying at least one predefined rule to the original note data, synchronizing the original audio data of the song to the modified note data, such that when the modified note data is played correctly by the musical instrument the original audio data is played, presenting the modified note data to a user, playing the original audio data when a user correctly plays the presented modified note data and interrupting the original audio data playback when a user makes an error in playing the presented modified note data.

Creating modified note data can include changing at least one of the following compared to original note data; pitches, length of notes, the string of a string instrument required to play a note, the fret of a fretted instrument required to play a note, the finger(s) required to play a note on the musical instrument.

Original note data can be obtained from original audio data of the song through note recognition software of the original audio data. Additionally and/or alternatively, original audio data can be synthesized from original note data. When emulated, original note data in an audio format can be therefore produced.

Examples of interruption of the audio playback can be any one or a combination of any of the following; stopping playback, modifying the original audio data playback in a manner representative of the error, adding a sound to the original audio data playback, adding a sound to the original audio data playback which is representative of the error, adjusting the volume of the audio data playback.

DETAILED DESCRIPTION OF EXEMPLARY EMBODIMENTS

Figure 3:
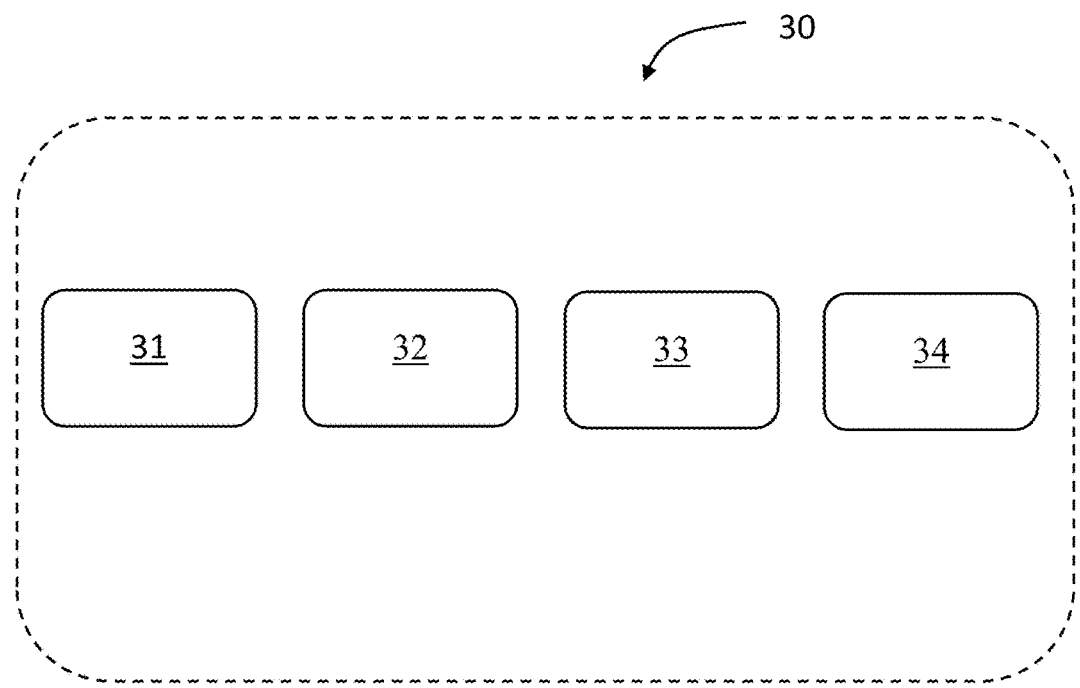
FIG. 3 shows a representitive method according to the present invention.

A method for producing modified music can be for facilitating playing of a musical instrument and/or facilitate learning of a song, for example as shown in FIG. 3. Such methods 30 can include several computer implemented steps which can be some or all of the following steps; digitally obtaining original note data about a song and/or original audio data of the song 31, creating modified note data for a musical instrument 32, synchronizing audio data of the song to the modified note data 33, and presenting the modified note data to a user 34. The steps can also be ordered as outlined above and below.

The musical instrument can be an acoustic, electric, digital or virtual instrument. Examples can be a guitar, a violin, a stringed instrument, a fretted instrument, a piano, a percussion instrument, etc. In examples where the instrument is either acoustic or is not capable of being directly connect, or is not directly connected, to an electronic device, the musical instrument can be played by a user and an audio output from the musical instrument can be captured by a microphone or other suitable input of an electronic device. The audio output of the instrument can then be analyzed and by note recognition or melody recognition software by an electronic device. The analyzed audio output, or the audio output itself can then be used in connection with the present embodiments and examples. Additionally, an electrical instrument, virtual instrument, midi instrument or the like which is, or can be, connected directly or indirectly to an electronic device can be used in connection with the present methods by using a direct or converted output from the instrument itself. In any of these cases, the output from a musical instrument can be presented or played to the user or another synthesized output based in part on the user's playing can be output, as will be described in more detail below.

Regarding modification of music for a song, information about the song can be obtained by an electronic device. Information can be in the form of original note data about the song and/or original audio data of the song. For instance, an audio file about a song can be obtained by input or downloading to the electronic device. If there is note data available, either in musical notation on one or more staffs, chord data, tabular data or other digital format, the note data can be retrieved and/or similarly input with the audio file.

Note data about the song can also be generated from an audio file through note recognition software. Examples of some note recognition methods can be found in U.S. application Ser. Nos. 14/979,731 and 15/196,136 which are incorporated by reference in their entirety herein. Furthermore, original audio data of a song can be generated by synthesizing or otherwise creating or re-creating an audio file based on note data about a song. Therefore, digitally obtaining original note data about a song and original audio data of a song can include simply imputing/obtaining each or it can include inputting/obtaining either one and generating the other.

Based at least in part on original note data, or note data of a song to be played/learned, modified note data is created. The modified note data is created by applying at least one predefined rule to the original note data. Examples of predefined rules will be discussed below in more detail. However, the predefined rules are selected and/or created in order to allow a student to focus on fewer than all of the attributes of an original song. For example, any given song is composed of a plurality of components or attributes including; notes, rhythm, melody, timing, strumming, chord changes, transitions, transposition, etc. For either a beginner student or someone learning a complicated song for the first time, trying to learn everything at once can be to complicated, frustrating or intimidating. Therefore, by applying a predefined rule which reduces the complexity of at least one of these or another component/attribute, it is easier and/or more enjoyable for someone to learn the song. For example, the complexity of the melody can be reduced by removing some notes but keeping the same general ascending/descending patterns of the melody. Another example is that some or all of the notes can be replaced by fewer, e.g. one or two notes, so that the student can focus on timing, rhythm, strumming or another attribute.

Learning an instrument is almost always a challenge for the student. One of the challenges is that while there are plenty of "easy" songs or exercises for a student to play, they are often times monotonous, uninteresting or even annoying. Most students start playing a musical instrument wanting to play a favorite song eventually, and getting to the point where they can play that song may take months or years. Most students will lose interest in playing before they reach that ability level. Additionally, most students learning a musical instrument do not have the music theory knowledge to make a difficult song easier for themselves. Therefore, by creating the modified note data electronically and presenting it to the user, the user can select any song they like and know and essentially can create simple versions of the song and/or exercises based on that song itself. This very clearly is more interesting to a student than learning a children's song or scale.

Additionally, audio data about a song that the user wants to play can be synchronized with the modified note data created by the methods herein. Similarly how a user can get bored or can be uninspired by playing simple exercises, this can also happen, though to a lesser degree, when playing the specific exercises created by the methods herein. When a user plays the modified note data on a musical instrument, the musical instrument can create sound and/or audio data corresponding to the modified note data. This sound or audio information can be presented to the user. Additionally or alternatively, the original song can be played to the user when they are playing the modified note data. This can be accomplished with the synchronization of the original audio data and the modified note data.

For example, the original audio data of the song can be synchronized with the modified note data such that when the modified note data is played correctly by a musical instrument then the original audio data is played. For example, if a rule is applied to a song which reduces the notes to a single pitch so that a user can focus on rhythm, timing and/or strumming, if the user plays the correct rhythm then instead of hearing the single note played the user will hear the actual song being played. This way the user is kept interested as they are hearing a song instead of hearing a single note being played and having to imagine themselves what the song would sound like.

The synchronization can be with an entire audio file or a portion of an audio file. For example, if an audio file is of a song having several instruments, the synchronization can be with the entire song or it can be specifically with the audio portion related to the instrument which the modified note data has been generated for. As an example, if a song has a singer, a bass, a guitar and drums, and the user is learning the part of the guitar, then the modified notes are to for the guitar's portion of the song. The audio file can be analyzed and the audio components for each of the parts, or for just that of the musical instrument being learned, can be separated. Once separated, then the method for creating modified note data can be applied to the portion of the audio file related to the part for the musical instrument being learned. The modified note data can be synchronized with the separated part corresponding to the musical instrument to be learned. Then, when a user plays the modified note data the portion of the audio file for that instrument from the song can be played alone or it can be recombined and played with the whole song.

The playback of the original audio or a portion thereof can be, for example, in head phones, with a speaker or other audio playback device connected with an electronic device carrying out the methods herein. The playback can also be from a musical instrument or device connected thereto such as an amp connected with an electric guitar or from a electronic keyboard.

The manner in which the modified note data is synchronized with audio data can be dependent on the rule used to create the modified note data itself. For example, if the rule used to create the modified note data reduces the number of notes in order to focus on rhythm, then each note or notation from the modified note data can be synchronized to the corresponding pitch of the audio data. According to such a synchronization, when the user plays the first five notes, the audio data will play the first five pitches with the same timing as played by the user. This way, the user can easily hear if they are playing the correct rhythm if they hear a familiar song. If the user rushes a note or otherwise makes an error in the timing or rhythm, this can be reflected directly in the audio outcome with the correct pitches but with the user's played timing. If the audio data for the musical instrument is combined with other portions from a song, but only synchronized with the specific instruments portion of the file, then the rest of the instruments can continue with the song and the user can speed up or slow down their part in order to practice playing in time with other musicians. The user will then quickly learn when they are playing the correct rhythm or when they are making an error, which can otherwise be difficult for a beginning musician to detect.

The synchronization can take several other forms as discussed below. Additionally, the audio playback can be altered in several ways based on the users playing, correctness in how they play or other criteria, as discussed below. Combinations of all of the variables discussed are encompassed by the present invention though they may not all be individually stated herein for brevity.

Examples of ways in which the audio playback can be altered based on the user's playing include interrupting the original audio data playback when a user makes an error in playing the presented modified note data. The interruption can be one of the following; stopping playback, modifying the original audio data playback in a manner representative of the error, adding a sound to the original audio data playback, adding a sound to the original audio data playback which is representative of the error, adjusting the volume of the audio data playback.

Additionally, the synchronization and playback can be arranged such that the when the correct modified note is played by the user then the audio file progresses and otherwise is either silent, paused or essentially "stuck" on the previous note. In such an arrangement where, for example, the rule applied is to reduce the complexity of the song by reducing the complexity or number of chords to work on learning chords or chord transitions, then a user can strum along on one chord and the audio file progresses. This can be regardless if the strumming is in the correct rhythm or if the user is playing the correct melody as long as the basic chord or fingering is correct. Once a transition arises, once the user gets the new chord correct then the audio file will continue.

Additionally, synchronizing can include synchronizing the entire length of the original audio data to the entire length of the modified note data such that the timing of playback of the audio data is not dependent on a user following the modified note data. The synchronization can also be to only a portion of the audio file. The synchronization can be by synchronizing notes, bars or other musical identifiers in the original audio data which correspond to the corresponding portion of the modified note data such that playback of the original audio data is dependent on the playing of the modified note data by a user.

There can also be a rating factor which figures in to the playback. The rating factor can be a simple percentage of correct notes and/or rhythm played or it can be a more complicated factor determination method. There may also be, together with or separate from the rating factor, a series of difficulty levels. For example, in a beginner level, if a user has beyond a certain rating factor, e.g. correctly plays more than 90% of the notes, then the audio playback can be played normally without any modifications to the playback, e.g. it can be played back as if the user had not made and mistakes. A difficulty level can be adjusted such based on the level of accuracy of the user has a closer correlation to the type of alteration made in the audio playback based on the error made by the user in playing back the modified note data.

The rating factor can be compared to the modified note data, information on the user's playing of the modified note data, the original note data, the original audio data or a combination thereof. New modified note data can also be created, for example based on the rating and/or difficulty level, by applying at least one predefined rule to either the original note data or the old modified note data. The new modified note data can be synchronized with the original audio data, or other audio data and presented to the user. For example, if the user starts by learning the rhythm, if the user is successfully playing the rhythm for a first portion of the song then new modified note data can be presented during the playing of that same iteration of the song where additional notes are provided so the user can start learning pitches, melody, chord transitions or other attributes of the song without needing to start over playing of the song.

Similarly, if the modified note data is proving to difficult for the user then a new rule can be applied such that the modified note data becomes easier for the student. This can alleviate possible frustration and aide in teaching the user at the level at which they can best learn.

Creating the modified note data can include changing at least one of the following compared to the original note data; pitches, length of notes, the string of a string instrument required to play a note, the fret of a fretted instrument required to play a note, the finger(s) required to play a note on the musical instrument. Creating the modified note data can also include any combination of the above.

Examples of predefined rules which can be applied to create the modified note data are; simplifying the notes to a single pitch without changing the rhythm, reducing the number of notes according to a predefined formula, replacing notes with predefined notes, replacing notes or chords with notes or chords requiring fewer strings than the original on a stringed instruments, replacing notes or chords with notes or chords requiring fewer fingerings than the original on the musical instrument, replacing notes or chords with notes or chords requiring fewer frets or fret changes than the original on a fretted instruments, or any combination thereof.

As an example, if a user knows three chords, you can take any song that only uses three chords and according to a replacement rule, replace those three chords with the ones the user knows. This way the user can practice switching between chords and can play different songs. The chord progression can be the same in the modified note data, e.g. the lowest chord in the original song can be replaced with the lowest chord known by the user, the middle and highest replaced accordingly as well. Additionally, if a song uses more than three chords, the chord transition can be replaced with only the three chords that the user knows according to several different rules. For example, each chord transition in the song can be replaced with a chord transition between the three known. Additionally, fewer chord transitions can be made in the modified note data which correspond to specific, or major chord changes in the original song.

Chord progression in the modified note data can correspond to the simplest transition between the known chords of the user. For example, if the user knows chords "A", "C" and "D", and it is easiest to transition fingers on a stringed instrument between chords "A" and "C", then the modified note data can arrange transitions between chords "A" and "C" regularly even if that transition would not otherwise correspond to the direction of pitch change in the original song.

Figure 1:
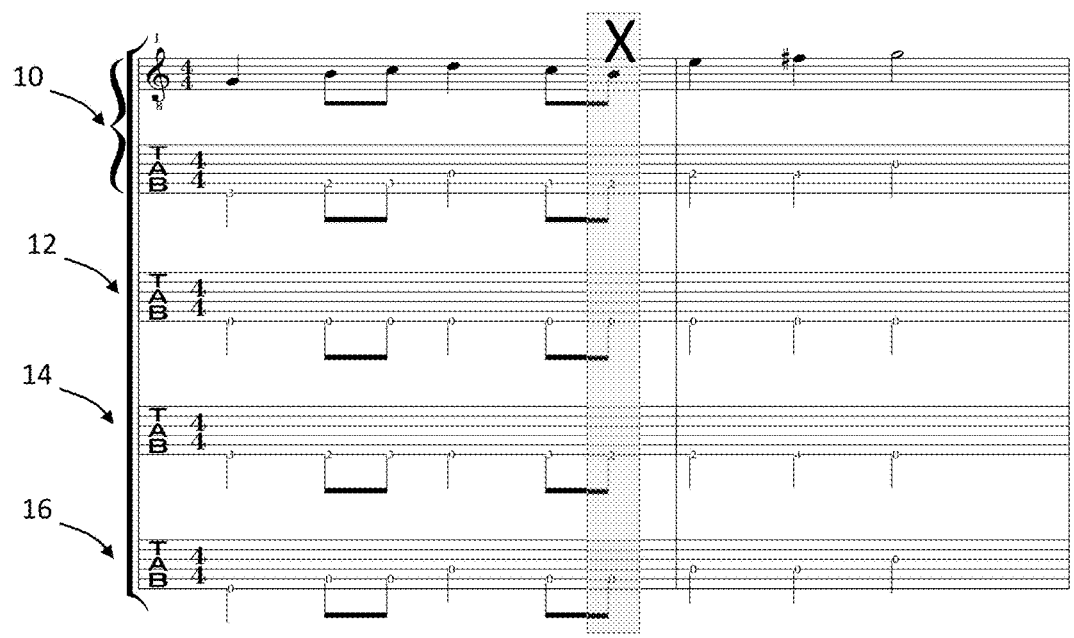
FIG. 1 shows a first set of staffs.

FIG. 1 shows an example of original note data and modified note data. Staffs 10 shows a representation of a musical piece with traditional notation on top and as a guitar tab notation on bottom. A user can be presented with modified note data such as shown as staffs 12, 14 and 16. Each modified staff has been modified based on a rule and the original staff data.

Staff 12 is arranged so that a player is presented with just the rhythm. For example, on a guitar or violin, the fret and/or string played is irrelevant. A rule can be applied that the timing and length of each note from the original note data can be copied and fret and string data associated therewith can be omitted. An arbitrary note can be selected to be shown, the rhythm can be displayed in a manner not on a staff, or a specific note can be chosen as shown.

Staff 14 can be arranged such that the player must play the correct frets along with the correct rhythm, however the correct string can be irrelevant. As such, a rule is applied that information on the timing and length of each note as well as fret data from or corresponding to the original audio file or original note data can be copied while string information is omitted.

Staff 16 can be arranged such that the player must play the correct string and the correct rhythm but the fret is irrelevant. A rule can be applied that the timing, length and string information from the original note data is copied but fret data is omitted.

Figure 2:
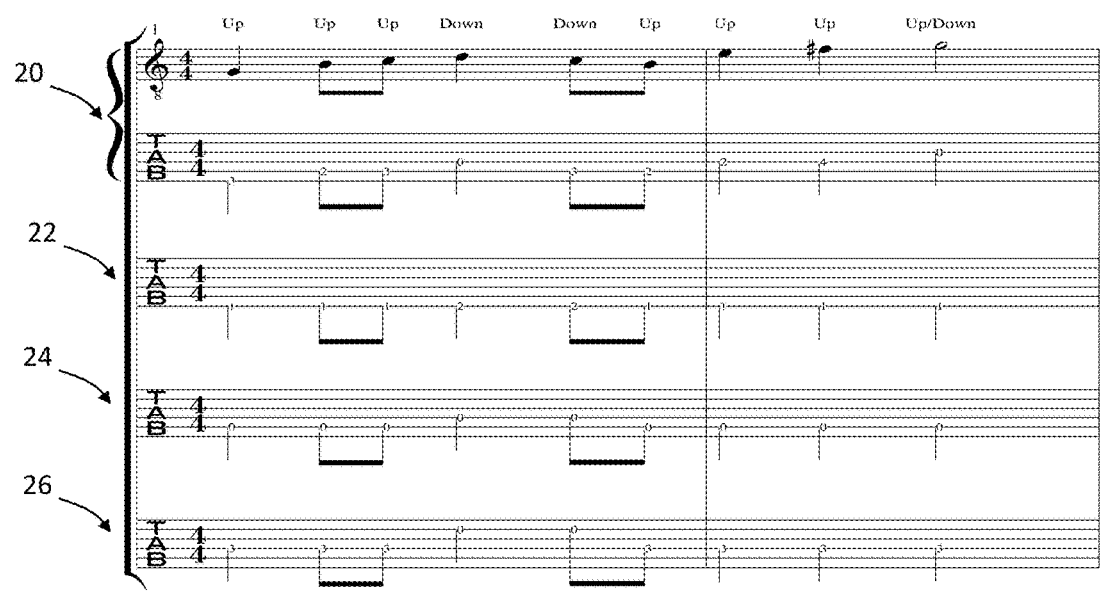
FIG. 2 shows a second set of staffs.

Additional rules can be related to the melody curve, as shown in example FIG. 2. For a fretted instrument, as an example, one fret can be assigned to represent a downward motion in a melody and another fret can be assigned to represent an upward motion in a melody. These frets can be selected based on information in the song, they can be arbitrary or they can be based on information known about the user, such as which skill level they are, what chords they know or based on something in particular that is to be taught.

If a note next to a current one is higher than the previous one, then the up fret can be supplied in the modified note data. Similarly if the next note is lower than the previous, then the down fret can be supplied in the modified note data. The modified note data may contain only these two frets. These series of these two frets can be represented with the same timing and length as the respective notes or with an arbitrary or otherwise selected set of timing or lengths. As shown in FIG. 2, where staffs 20 represent a normal musical notation on top of a melody and tabular notation below, in staff 22 and/or with the written up/down notation above staff 20, the melody curve can be followed with two frets. In place of frets as discussed above, specific chords, notes, strings, keys or other features can be used.

Staff 24 shows a similar example where a melody curve can be followed with two strings, with one string representing a down movement and another representing an up movement in the melody curve. Staff 26 shows that other combinations of frets and strings can be used in a simplified manner to follow the melody curve. More than two of any of the elements, e.g. strings or frets, can be used in order to add more detail to the melody curve. Additionally, similar rules can be applied to chord transitions within a song where one string or fret corresponds to a type of change in the chord and another string/fret to another type of change.

With a stringed instrument, a single pitch can be played from multiple locations on the instrument. Therefore, a guitar like tab notation version of the modified note data can be presented in multiple ways and/or in traditional notation, e.g. tabs can be written in several positions and the positions can also change dynamically as discussed herein with other attributes of the song. Piano and percussion notation can also be similarly used and modified in accordance with the methods described herein.

Notation and information from the original audio file or original note data can be written and/or visual. However, the data can also be purely digital. Similarly, the modified note data can be purely digital, visual or a combination thereof.

Pitch data which describes the pitch for some or all possible string-fret combinations can be present in the original audio and/or note data. Such pitch data may also be absent from that original audio and/or note data. Such pitch data can be determined and either added to said data or it can be kept in a separate file, if needed, and used in the creation of the modified note data. The pitch of the same fret from the same string might vary depending on the instrument of the tuning of the instrument and this can also be taken into account within the methods described herein.

Additionally, the rule applied can be simply reducing the number of notes from within an original piece. For some notes only playing the correct rhythm and string can be enough and for others the correct fret or chord can be enough. Gradually, notes and complexity can be added, for example based on the rating described above, until all of the notes are being played.

Modified note data can be presented in a variety of manners, such as being presented on a display screen of an electronic device. It may also be presented, in the form of musical notations visually to a user, in the form of audio and/or visual cues to a user, or in any combination of the above. For example, on an electrical musical instrument the correct note, fingering, timing or other information can be presented by visually lighting up a string, key or button or by creating a vibration or other tactile sensation thereon for the user based on the modified note data.

As discussed above, methods can further include obtaining information about a user playing the modified note data by a musical instrument. Additional steps can include emulating music for the user based on the synchronized audio data, the modified note data, the obtained information, or a combination thereof. Music can be at least partially emulated on and/or by the played musical instrument. Music can be played to the user by an electronic device and/or a musical instrument.

Information about how the user is playing a musical instrument, e.g. how they are playing the modified note data, can be obtained by a microphone. The microphone or other audio collection device can be a part of and/or connected to an electronic device. The electronic device can be carrying out a method as discussed herein. The information about how the user is playing the musical instrument can also be obtained directly from the played musical instrument.

Figure 4:
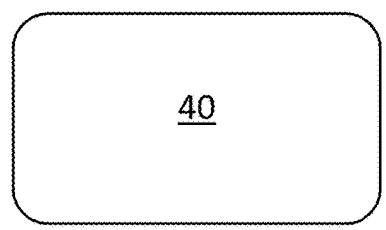
FIG. 4 shows a representative device according to the present invention.

There can be a non-transitory computer readable medium having stored thereon a set of computer implementable instructions for causing the processor of an electronic device to carry out any combination of the above mentioned method steps. Additionally, there can be an electronic device 40, for example as shown in FIG. 4, comprising a display means, a microphone and/or audio input, an audio output and a non-transitory computer readable medium having stored thereon a set of computer implementable instructions for causing the processor of an electronic device to carry any of the above mentioned method steps.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for producing modified music for facilitating playing of a musical instrument, said method comprising the computer implemented steps of:
   digitally obtaining original note data about a song and original audio data of the song,
   creating modified note data for a musical instrument by applying at least one predefined rule to the original note data,
   synchronizing the original audio data of the song to the modified note data, such that when the modified note data is played correctly by the musical instrument the original audio data is played, and
   presenting the modified note data to a user.

2. The method of claim 1, further comprising:
   playing the original audio data when a user correctly plays the presented modified note data.

3. The method of claim 1, further comprising:
   interrupting the original audio data playback when a user makes an error in playing the presented modified note data.

4. The method of claim 3, wherein the interruption is one of the following;
   stopping playback, modifying the original audio data playback in a manner representative of the error, adding a sound to the original audio data playback, adding a sound to the original audio data playback which is representative of the error, adjusting the volume of the audio data playback.

5. The method of claim 1, wherein the original note data is obtained from the original audio data of the song through note recognition software of the original audio data.

6. The method of claim 1, wherein the original audio data is synthesized from the original note data and therefore when emulated it produces the original note data in audio format.

7. The method of claim 1, wherein creating the modified note data includes changing at least one of the following compared to the original note data; pitches, length of notes, the string of a string instrument required to play a note, the fret of a fretted instrument required to play a note, the finger(s) required to play a note on the musical instrument.

8. The method of claim 1, wherein the predefined rule is at least one of the following; simplifying the notes to a single pitch without changing the rhythm, reducing the number of notes according to a predefined formula, replacing notes with predefined notes, replacing notes or chords with notes or chords requiring fewer strings than the original on a stringed instruments, replacing notes or chords with notes or chords requiring fewer fingerings than the original on the musical instrument, replacing notes or chords with notes or chords requiring fewer frets or fret changes than the original on a fretted instruments.

9. The method of claim 1, wherein the synchronizing includes synchronizing the entire length of the original audio data to the entire length of the modified note data such that the timing of playback of the audio data is not dependent on a user following the modified note data.

10. The method of claim 1, wherein the synchronizing includes synchronizing notes, bars or other musical identifiers in the original audio data which correspond to the corresponding portion of the modified note data such that playback of the original audio data is dependent on the playing of the modified note data by a user.

11. The method of claim 1, wherein the modified note data is presented on a display screen of an electronic device.

12. The method of claim 1, wherein the modified note data is presented in the form of musical notations visually to a user.

13. The method of claim 1, wherein the modified note data is presented in the form of audio and/or visual cues to a user.

14. The method of claim 1, further comprising:
   obtaining information about a user playing the modified note data by a musical instrument, and
   emulating music for the user based on the synchronized audio data, the modified note data and the obtained information.

15. The method of claim 14, wherein the music is at least partially emulated on and/or by the played musical instrument or wherein the music is played to the user by an electronic device.

16. The method of claim 14, wherein the information is obtained by a microphone of an electronic device or obtained directly from the played musical instrument.

17. The method of claim 14, wherein the accuracy of the user's playing is rated compared to the modified note data.

18. The method of claim 17, wherein based on the rating a new modified note data is created by applying at least one predefined rule to either the original note data or the old modified note data, and wherein the new modified note data is synchronized with the original audio data and presented to the user.

19. A non-transitory computer readable medium having stored thereon a set of computer implementable instructions for causing the processor of an electronic device to carry out the method steps of:
   digitally obtaining original note data about a song and original audio data of the song,
   creating modified note data for a musical instrument by applying at least one predefined rule to the original note data,
   synchronizing the original audio data of the song to the modified note data, such that when the modified note data is played correctly by the musical instrument the original audio data is played, and presenting the modified note data to a user.

20. An electronic device comprising a display means, a microphone and/or audio input, an audio output and a non-transitory computer readable medium having stored thereon a set of computer implementable instructions for causing the processor of an electronic device to carry out the method steps:

digitally obtaining original note data about a song and original audio data of the song, creating modified note data for a musical instrument by applying at least one predefined rule to the original note data, synchronizing the original audio data of the song to the modified note data, such that when the modified note data is played correctly by the musical instrument the original audio data is played, and presenting the modified note data to a user.

\* \* \* \* \*